United States Patent

Saylor

[11] 4,053,164
[45] Oct. 11, 1977

[54] SPACER-EXPANDER FOR A PISTON OIL CONTROL RING

[75] Inventor: Lee H. Saylor, Muskegon, Mich.

[73] Assignee: Sealed Power Corporation, Muskegon, Mich.

[21] Appl. No.: 720,273

[22] Filed: Sept. 8, 1976

[51] Int. Cl.² .............................................. F16J 9/20
[52] U.S. Cl. .................................. 277/139; 277/76; 277/155; 267/1.5
[58] Field of Search .............................. 277/138–141, 277/76, 155, 218–222, 9, 9.5, 11; 267/1.5

[56] References Cited

U.S. PATENT DOCUMENTS

| | | | |
|---|---|---|---|
| 2,474,493 | 6/1949 | Phillips | 277/141 X |
| 2,744,803 | 5/1956 | Marien | 277/139 |
| 2,785,028 | 3/1957 | Olson | 277/140 |
| 2,809,081 | 10/1957 | Olson | 277/138 |
| 2,859,079 | 11/1958 | Olson | 277/139 |
| 3,124,364 | 3/1964 | Burns et al. | 277/76 |
| 3,191,947 | 6/1965 | Hamm | 277/139 |
| 3,191,948 | 6/1965 | Hamm | 277/139 |
| 3,228,704 | 1/1966 | Hamm | 277/138 |
| 3,477,732 | 11/1969 | Warrick | 267/1.5 X |
| 3,628,800 | 12/1971 | Prasse | 277/139 X |
| 3,741,569 | 6/1973 | Mayhew | 277/140 |
| 3,787,059 | 1/1974 | McCormick | 277/9 X |

Primary Examiner—Robert S. Ward, Jr.
Attorney, Agent, or Firm—Barnes, Kisselle, Raisch & Choate

[57] ABSTRACT

In a spacer-expander for a piston oil control ring of the type which includes a circumferential series of alternating inner and outer crowns successively connected by radially diverging spring legs and a support pad extending radially outwardly from each inner crown and connected thereto by a pad leg, the improvement wherein each pad leg comprises an arcuate reverse bend extending radially inwardly and then radially outwardly from an inner crown to a corresponding support pad. In a modification, each pad extends radially outwardly at an angle of more than 90° but equal to or less than 95° with respect to the corresponding inner crown in the free-state of the expander.

8 Claims, 6 Drawing Figures

U.S. Patent   Oct. 11, 1977   4,053,164
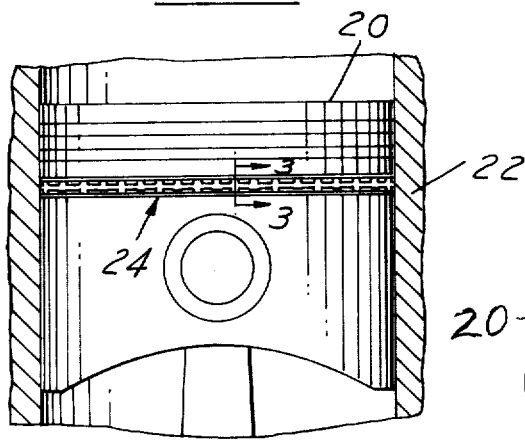
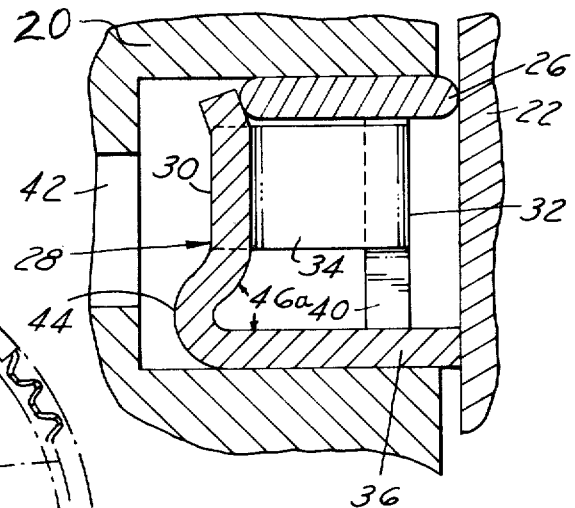
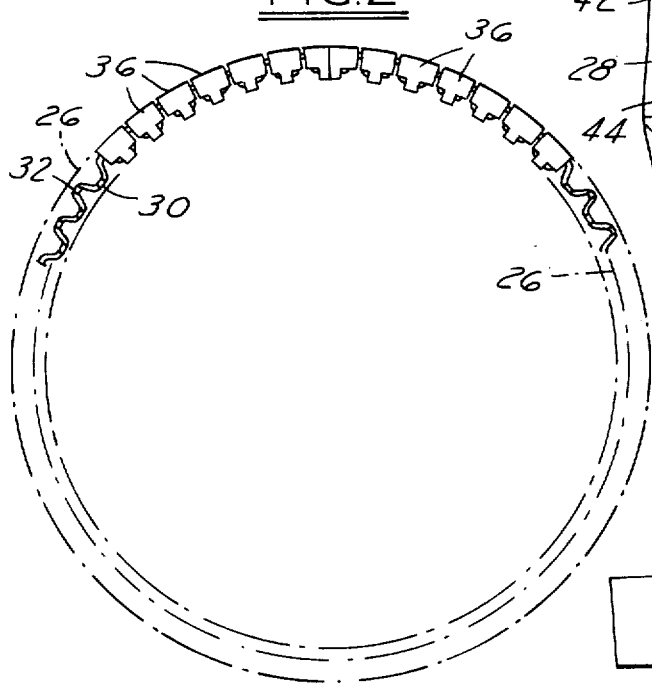
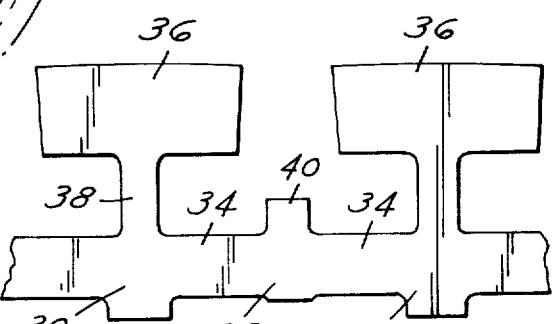
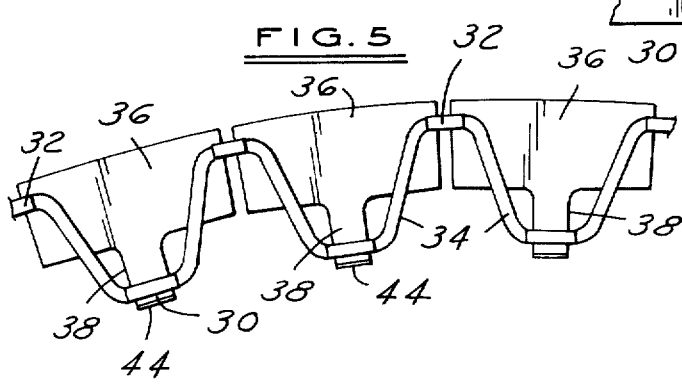
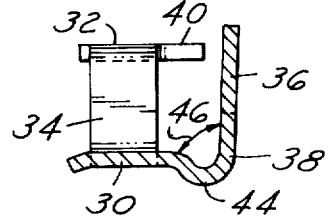

SPACER-EXPANDER FOR A PISTON OIL CONTROL RING

The present invention relates to piston rings and, more particularly, to an improved oil control ring and to a spacer-expander for use therein. Specifically, the invention relates to improvemets in spacer-expanders and oil control rings of the type disclosed in Burns et al U.S. Pat. No. 3,124,364.

It is an object of the present invention to provide a spacer-expander of the above-mentioned type which is economical to fabricate and install into an engine, which has improved stability during the installation process, which possesses enhanced operating characteristics, and/or which is adapted to accommodate dimensional and contour variations in the sealing surfaces.

The novel features which are considered to be characteristic of the present invention are set forth in particular in the appended claims. The invention itself, however, together with additional objects, features and advantages thereof, will be best understood from the following description when read in conjunction with the accompanying drawings in which:

FIG. 1 is a fragmentary elevational view of an engine equipped with an oil control ring in accordance with the invention;

FIG. 2 is a bottom plan view of an oil ring according to the invention apart from an engine;

FIG. 3 is an enlarged sectional view taken along the line 3—3 of FIG. 1;

FIG. 4 is an enlarged fragmentary plan view of a stamped section of strip stock from which the expander is formed;

FIG. 5 is an enlarged fragmentary top plan view of a spacer-expander in accordance with the invention; and FIG. 6 is a radial sectional view of a modified expander according to the invention.

Referring to FIG. 1, a piston 20 is disposed to reciprocate within a cylinder 22 of a gasoline- or diesel- powered internal combustion engine. Piston 20 is provided with the usual peripheral groove in which an oil control ring 24 in accordance with the invention is disposed for sealing engagement with the opposing wall of cylinder 22. Referring to FIGS. 2–5, oil control ring 24 includes a flat parted circular upper rail 26 having an outer peripheral edge, and a circular parted spacer-expander 28 disposed to bias the outer edge of rail 26 into sealing engagement with the cylinder wall. Spacer-expander 28 comprises a circumferential series of alternating inner and outer crowns 30, 32 interconnected by alternating contiguous legs 34 generally diverging in the radial direction and lending a generally corrugated appearance to the spacer-expander when viewed from the axial direction.

A circumferential series of generally arcuate support pads 36 extends radially outwardly from inner crowns 30, each pad 36 being integrally connected along it inner edge to a corresponding inner crown 30 by a pad leg 38. The outer peripheral edge of each pad 36 is disposed outwardly of outer crowns 32 and is curved in an arc having a diameter equal to the diameter of cylinder 22 so that pads 36 act as oil scraping elements in the assembled and operating condition of the control ring, as best seen in FIG. 3. The circumferential edges of pads 36 may be slightly beveled to prevent scoring of the cylinder wall. Outer crowns 32 extend at 40 in the direction of pads 36 to space the pads from the outer crowns, and to thus provide an open region between the pads and the spring corrugations which cooperate with ports 42 in piston 20 to drain oil scraped from the cylinder wall back to the oil sump (not shown). Expander 28 is preferably formed in a progressive blanking and bending operation from a continuous length of strip stock, one section of which is shown in FIG. 4. The oil control ring and spacer-expander as thus far discussed is shown and described in greater detail in connection with FIGS. 12–14 of the above-referenced Burns et al. patent.

In accordance with one important aspect of the present invention, each of the legs 38 connecting an inner crown 30 with a corresponding pad 36 is bent radially inwardly from the contiguous inner crown and then radially outwardly toward the contiguous pad to form an arcuate reverse bend 44 in the pad leg. The inside radius of reverse bend 44 is preferably substantially equal to the thickness of the ribbon stock from which expander 28 is formed. Reverse bends 44 provide two significant advantages. First, a longer bearing area for sliding contact is provided between each support pad leg and the opposing wall of the piston groove. Furthermore, and perhaps more importantly, it has been found that reverse bend 44 provides enhanced stability for the control ring assembly while the assembly is being radially compressed for insertion into a cylinder. This improved stability is believed to result from the fact that the radial spring force for pads 36 is provided primarily by flexure of bend 44, thereby reducing the tendency of the expander to twist clockwise as viewed in FIG. 3.

Preferably, each pad extends radially at an angle of 90° (within manufacturing tolerances) from a correspondng lower crown in the free-state of the expander. In accordance with yet another important aspect of the invention, however, expander 28 may alternatively be formed such that each pad 36 extends with respect to the corresponding inner crown 30 at an angle 46 slightly greater than 90° in the relaxed or unloaded condition of the expander as shown in FIG. 6. In the preferred form of the modification illustrated in FIG. 6, angle 46 is greater than 90° but equal to or less than 95°. The oil ring groove in piston 20 is preferably dimensioned such that angle 46 is compressed by the opposing groove wall when the oil ring is installed therein, the compression limit being an angle 46a of 90° as depicted in FIG. 3. Although provision of angle 46 will reduce the bearing area of sliding contact between pads 36 and the groove wall when the angle is not fully compressed, such provision has several significant advantages. When angle 46 is greater then 90° in the assembled condition, line contact will exist between pads 36 and the edge of the opposing groove wall, thereby providing a measure of side sealing between the pad and groove wall such that oil will be routed with greater velocity between the pads to provide enhanced flushing and cooling. Moreover, enlarged angle 46 allows the expander to accommodate a range of piston groove dimensions, thereby reducing the tolerance requirements and the manufacturing cost of piston 20. The enlarged angle also allows the expander to shift axially in the piston groove to equalize the sealing forces applied by rail 26 and pads 36.

The invention claimed is:

1. In a parted circular spacer-expander adapted for use in combination with a parted rail as a nonbottoming self-expanding piston oil control ring and including a plurality of alternating concentric circumferentially spaced inner and outer crowns integrally interconnected by generally diverging spring legs and a plurality of supporting pads, each said pad having an inner edge integrally connected by a pad leg to a corresponding inner crown and having an outer edge disposed outwardly of said outer crowns, the improvement wherein each said pad leg comprises a reverse bend extending radially inwardly from an inner crown and then radially outwardly to a corresponding pad.

2. The combination set forth in claim 1 wherein said reverse bend is arcuate in radial cross section of said expander.

3. The combination set forth in claim 2 wherein said spacer-expander is formed of ribbon stock having a stock thickness, and wherein said arcuate reverse bend has an inside radius substantially equal to the thickness of said ribbon stock.

4. The combination set forth in claim 1 wherein each said pad extends radially at an angle greater than 90° with respect to said corresponding inner crown in the free-state of said spacer-expander.

5. In a parted circular spacer-expander adapted for use in combination with a parted rail as a first oil scraping element in a piston oil control ring disposed in a piston groove and including a plurality of alternating concentric circumferentially spaced inner and outer crowns integrally interconnected by generally diverging spring legs and a plurality of radially outwardly extending support pads, each said pad having an inner edge integrally connected by a pad let to a corresponding inner crown and having an outer edge disposed outwardly of said outer crowns and adapted to cooperate with the outer edges of adjacent pads to form a second oil scraping element in the assembled and operating condition of the ring, the improvement wherein each said pad extends radially at an angle greater than ninety degrees with respect to said corresponding inner crown in the free-state of said spacer-exander.

6. The combination set forth in claim 5 wherein said angle is equal to or less than 95°.

7. The combination set forth in claim 5 wherein said angle is greater than ninety degrees in the assembled condition of said spacer-expander, such that each said pad is in line contact with an opposing edge of said piston groove.

8. The combination set forth in claim 5 wherein each said pad leg comprises a reverse bend extending radially inwardly and then radially outwardly from an inner crown to a corresponding pad.

* * * * *